United States Patent
Liu et al.

(10) Patent No.: US 10,598,533 B2
(45) Date of Patent: Mar. 24, 2020

(54) LIMITING A CURRENT DRAWN BY TWO OR MORE METER ASSEMBLIES

(71) Applicant: Micro Motion, Inc., Boulder, CO (US)

(72) Inventors: Huan Liu, Nanjing (CN); Kai Shen, Nanjing (CN); Fengchuan Gao, Nanjing (CN)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 16/072,364

(22) PCT Filed: Feb. 26, 2016

(86) PCT No.: PCT/CN2016/074624
§ 371 (c)(1),
(2) Date: Jul. 24, 2018

(87) PCT Pub. No.: WO2017/143576
PCT Pub. Date: Aug. 31, 2017

(65) Prior Publication Data
US 2019/0033113 A1    Jan. 31, 2019

(51) Int. Cl.
*G01F 1/84* (2006.01)
*G05F 1/10* (2006.01)

(52) U.S. Cl.
CPC .............. *G01F 1/8468* (2013.01); *G01F 1/84* (2013.01); *G01F 1/8427* (2013.01); *G01F 1/8436* (2013.01); *G05F 1/10* (2013.01)

(58) Field of Classification Search
None
See application file for complete search history.

(56) References Cited

U.S. PATENT DOCUMENTS

| | | | |
|---|---|---|---|
| 4,109,524 A | 8/1978 | Smith | |
| 4,491,025 A | 1/1985 | Smith et al. | |
| 5,661,232 A | 8/1997 | Van Cleve et al. | |
| 6,487,507 B1 * | 11/2002 | Mansfield | G01F 1/8413 702/115 |
| 9,513,149 B1 * | 12/2016 | Henry | G01F 1/8477 |
| 2014/0074301 A1 | 3/2014 | Tanaka | |

FOREIGN PATENT DOCUMENTS

| | | |
|---|---|---|
| WO | 2008013545 A1 | 1/2008 |
| WO | 2008024112 A1 | 2/2008 |
| WO | 2008111983 A1 | 9/2008 |
| WO | 2009002341 A1 | 12/2008 |
| WO | 2009017494 A1 | 2/2009 |
| WO | 2009105096 A1 | 8/2009 |
| WO | 2009148451 A1 | 12/2009 |
| WO | 2010056244 A1 | 5/2010 |

* cited by examiner

*Primary Examiner* — Harshad R Patel
(74) *Attorney, Agent, or Firm* — The Ollila Law Group LLC (57) ABSTRACT

A method of limiting a current drawn by two or more meter assemblies (10a,10b) is provided. The method includes driving a first meter assembly (10a) with a first drive signal, comparing one or more operating parameters of the first meter assembly (10a) to an operating threshold, and driving a second meter assembly (10b) with a second drive signal based on the comparison to prevent a current drawn by the first meter assembly 10a and the second meter assembly (10b) from exceeding a current threshold.

15 Claims, 5 Drawing Sheets

LIMITING A CURRENT DRAWN BY TWO OR MORE METER ASSEMBLIES

TECHNICAL FIELD

The embodiments described below relate to vibratory sensors and, more particularly, to limiting a current drawn by two or more meter assemblies.

BACKGROUND

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have meter assemblies with one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode. When there is no flow through the flowmeter, a driving force applied to the conduit(s) causes all points along the conduit(s) to oscillate with identical phase or with a small "zero offset", which is a time delay measured at zero flow.

As material begins to flow through the conduit(s), Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit (s). Signals output from the pickoffs are processed to determine the time delay between the pickoffs. The time delay between the two or more pickoffs is proportional to the mass flow rate of material flowing through the conduit(s).

A meter electronics connected to the driver generates a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement.

Many systems utilize two or more meter assemblies due to various design constraints. For example, meter assemblies used in dispensing liquid natural gas (LNG) to LNG vehicles may utilize a first meter assembly to measure fuel pumped from an LNG storage tank to the LNG vehicle. A second meter assembly may be used to measure the fuel that is returned to the LNG tank. The fuel returned to the LNG tank may have a different flow rate, temperature, state, etc. However, each meter assembly has a single meter electronics.

Reducing the number of meter electronics can reduce the costs and complexity of the systems that require two or more meter assemblies. However, the current drawn from the meter electronics correspondingly increases as the number of meter assemblies coupled to the meter electronics increases. Accordingly, there is a need to limit the current drawn by two or more meter assemblies.

SUMMARY

A method of limiting a current drawn by two or more meter assemblies is provided. According to an embodiment, the method comprises driving a first meter assembly with a first drive signal, comparing one or more operating parameters of the first meter assembly to an operating threshold, and driving a second meter assembly with a second drive signal based on the comparison to prevent a current drawn by the first meter assembly and the second meter assembly from exceeding a current threshold.

A dual vibratory sensor system for limiting current drawn by two or more meter assemblies is provided. According to an embodiment, the dual vibratory sensor system comprises a first meter assembly, a second meter assembly, and a meter electronics communicatively coupled to the first meter assembly and the second meter assembly. The meter electronics is configured to drive the first meter assembly with a first drive signal, compare one or more operating parameters of the first meter assembly to an operating threshold, and drive a second meter assembly with a second drive signal based on the comparison to prevent a current drawn by the first meter assembly and the second meter assembly from exceeding a current threshold.

ASPECTS

According to an aspect, a method of limiting a current drawn by two or more meter assemblies comprises driving a first meter assembly with a first drive signal, comparing one or more operating parameters of the first meter assembly to an operating threshold, and driving a second meter assembly with a second drive signal based on the comparison to prevent a current drawn by the first meter assembly and the second meter assembly from exceeding a current threshold.

Preferably, the method further comprises comparing one or more operating parameters of the second meter assembly to the operating threshold.

Preferably, the one or more operating parameters is one of a resonance frequency and a current of the first meter assembly and the second meter assembly.

Preferably, the method further comprises indicating that the first meter assembly and the second meter assembly are operational.

Preferably, the method further comprises reducing the current drawn by one of the first meter assembly and the second meter assembly based on the comparison.

Preferably, reducing the current drawn by one of the first meter assembly and the second meter assembly comprises one of reducing the current drawn by the first meter assembly if the current drawn by the first meter assembly exceeds the operating threshold and reducing the current drawn by the first meter assembly if the current drawn by the second meter assembly exceeds the operating threshold.

Preferably, the method further comprises at least one of discontinuing the first drive signal if the comparison indicates that the first meter assembly is not operational and discontinuing the second drive signal if the comparison indicates that the second meter assembly is not operational.

Preferably, the first drive signal and the second drive signal are provided by a meter electronics communicatively coupled to the first meter assembly and the second meter assembly.

According to an aspect, a dual vibratory sensor system (5) for limiting current drawn by two or more meter assemblies comprises a first meter assembly (10a), a second meter assembly (10b), and a meter electronics (100) communicatively coupled to the first meter assembly (10a) and the second meter assembly (10b). The meter electronics (100) is configured to drive the first meter assembly (10a) with a first drive signal (14a), compare one or more operating parameters of the first meter assembly (10a) to an operating threshold, and drive a second meter assembly (10b) with a second drive signal (14b) based on the comparison to prevent a current drawn by the first meter assembly (10a) and the second meter assembly (10b) from exceeding a current threshold.

Preferably, the meter electronics (100) is further configured to compare one or more operating parameters of the second meter assembly (10b) to the operating threshold.

Preferably, the one or more operating parameters is one of a resonance frequency and a current of the first meter assembly (10a) and the second meter assembly (10b).

Preferably, the meter electronics (100) is further configured to indicate that the first meter assembly (10a) and the second meter assembly (10b) are operational.

Preferably, the meter electronics (100) is further configured to reduce the current drawn by one of the first meter assembly (10a) and the second meter assembly (10b) based on the comparison.

Preferably, the current drawn by one of the first meter assembly (10a) and the second meter assembly (10b) comprises one of reducing the current drawn by the first meter assembly (10a) if the current drawn by the first meter assembly (10a) exceeds the operating threshold, and reducing the current drawn by the first meter assembly (10a) if the current drawn by the second meter assembly (10b) exceeds the operating threshold.

Preferably, the method further comprises at least one of discontinuing the first drive signal if the comparison indicates that the first meter assembly (10a) is not operational, and discontinuing the second drive signal if comparison indicates that the second meter assembly (10b) is not operational.

BRIEF DESCRIPTION OF THE DRAWINGS

The same reference number represents the same element on all drawings. It should be understood that the drawings are not necessarily to scale.

DETAILED DESCRIPTION

FIGS. 1-5 and the following description depict specific examples to teach those skilled in the art how to make and use the best mode of embodiments of limiting a current drawn by two or more meter assemblies. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of limiting the current drawn by the two or more meter assemblies. As a result, the embodiments described below are not limited to the specific examples described below, but only by the claims and their equivalents.

Limiting the current drawn by the two or more meter assemblies may be performed, for example, by a meter electronics coupled to the two or more meter assemblies. The meter electronics may drive a first meter assembly with a first drive signal and compare one or more operating parameters of the first meter assembly to an operating threshold. The one or more operating parameters may be a current drawn by the first meter assembly, resonance frequency of the first meter assembly, or the like. Based on this comparison, the meter electronics may drive the second meter assembly with a second drive signal to prevent a current drawn by the first and second meter assembly from exceeding a current threshold. Preventing the current from exceeding the current threshold can ensure that the current does not exceed an electrical capacity of the meter electronics, as the following explains in more detail.

Vibratory Sensor System

Figure 1:
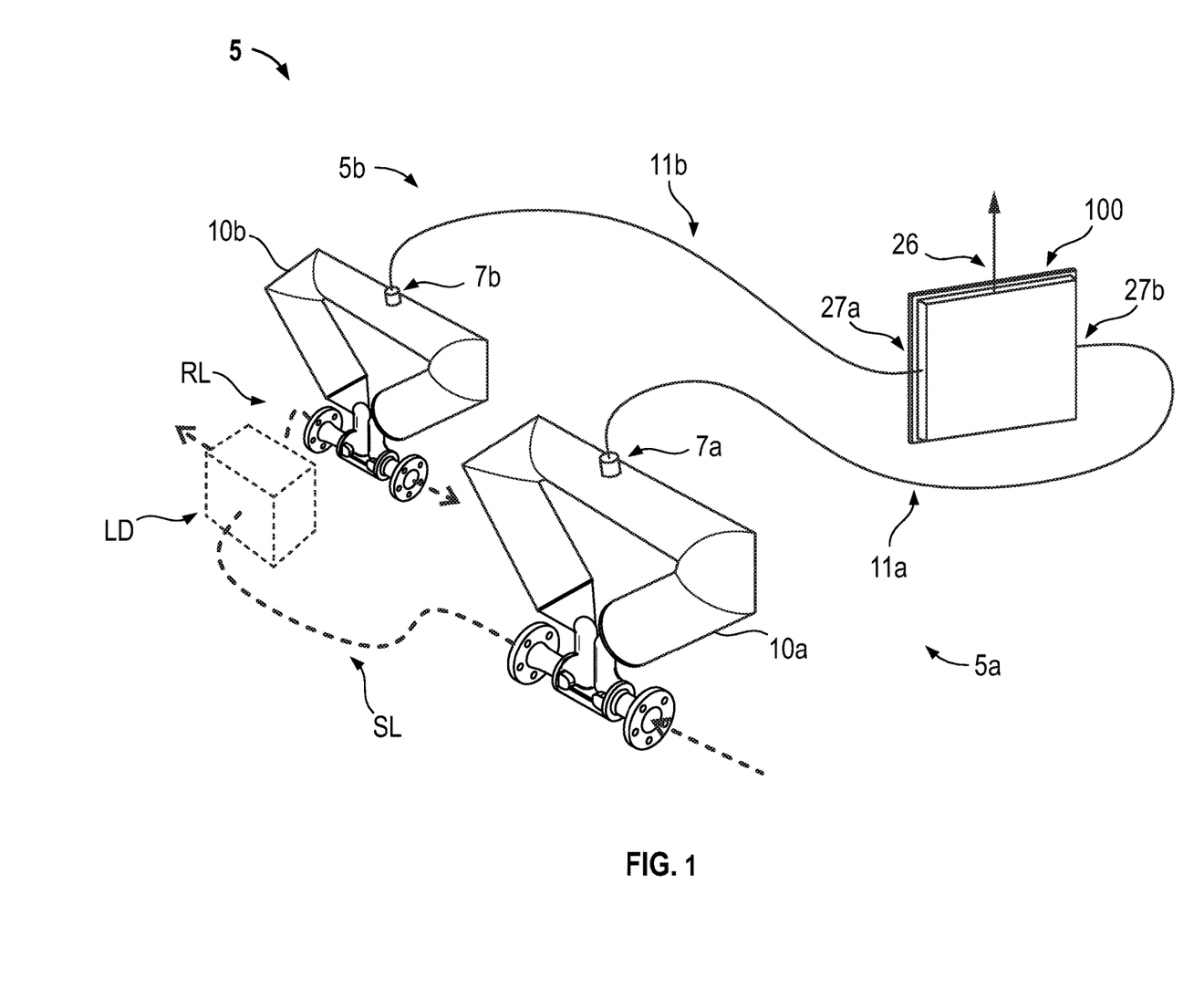
FIG. 1 shows a dual vibratory sensor system 5 for limiting a current drawn by two or more meter assemblies.

FIG. 1 shows a dual vibratory sensor system 5 for limiting a current drawn by two or more meter assemblies. As shown in FIG. 1, the dual vibratory sensor system 5 includes a first vibratory sensor 5a and a second vibratory sensor 5b. The first and second vibratory sensor 5a, 5b are respectively comprised of the meter electronics 100 and the first and second meter assembly 10a, 10b.

The meter electronics 100 is communicatively coupled to the first and second meter assembly 10a, 10b via a first and second set of leads 11a, 11b. The first and second set of leads 11a, 11b are coupled (e.g., attached, affixed, etc.) to a first and second communication port 27a, 27b on the meter electronics 100. The first and second set of leads 11a, 11b are also coupled to the first and second meter assembly 10a, 10b via a first and second communication port 7a, 7b on the first and second meter assembly 10a, 10b. The meter electronics 100 is configured to provide information over path 26 to a host. The first and second meter assembly 10a, 10b are shown with a case that surrounds flow tubes. The meter electronics 100 and first and second meter assembly 10a, 10b are described in more detail in the following with reference to FIGS. 2 and 3.

Still referring to FIG. 1, the first and second vibratory sensor 5a, 5b can be used to, for example, calculate a difference in flow rate and/or total flow between a supply line SL and a return line RL. More specifically, the dual vibratory sensor system 5 may be employed in a cryogenic application where fluid is supplied from a tank in liquid state and then returned to the tank in a gaseous state. In one exemplary cryogenic application, the first meter assembly 10a may be part of the supply line SL that supplies LNG to an LNG dispenser LD and the second meter assembly 10b may be part of a return line RL from the LNG dispenser LD. The total flow through the second meter assembly 10b can be subtracted from the total flow through the first meter assembly 10a to determine the total amount of LNG supplied from the LNG dispenser LD. This exemplary application with the supply and return line SL, RL is shown with dashed lines to illustrate that the dual vibratory sensor system 5 can be employed in other applications. In addition, other cryogenic fluids may be employed, such as hydrogen, or the like. As can also be appreciated, in the described and other embodiments, the calculations can be performed by the meter electronics 100, which is described in more detail in the following.

Figure 2:
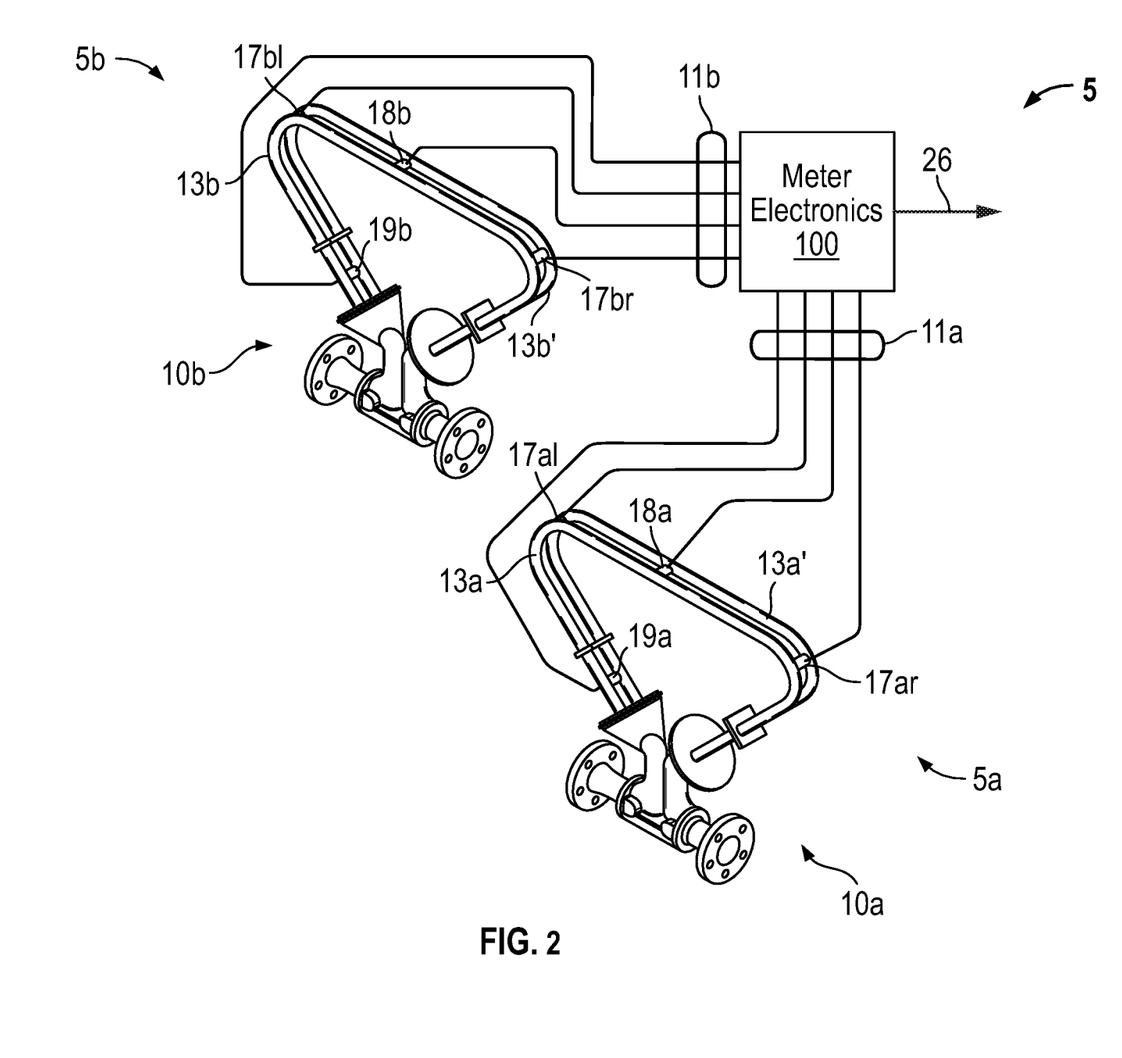
FIG. 2 shows the dual vibratory sensor system 5 for limiting a current drawn by two or more meter assemblies.

FIG. 2 shows the dual vibratory sensor system 5 for limiting a current drawn by two or more meter assemblies. As shown in FIG. 2, the dual vibratory sensor system 5 includes the first vibratory sensor 5a and the second vibratory sensor 5b described in the foregoing with reference to FIG. 1. The cases on the meter electronics 100 and first and second meter assembly 10a, 10b are not shown for clarity. The first and second meter assembly 10a, 10b respond to mass flow rate and density of a process material. The meter electronics 100 is connected to the first and second meter assembly 10a, 10b via a first and second set of leads 11a, 11b to provide density, mass flow rate, and temperature information over the path 26, as well as other information. A Coriolis flow meter structure is described although it is apparent to those skilled in the art that the present invention could be practiced as a vibrating conduit densitometer, tuning fork densitometer, viscometer, or the like.

The first and second meter assembly 10a, 10b include a pair of parallel conduits 13a, 13a' and 13b, 13b', a first and second drive mechanism 18a, 18b, temperature sensors 19a, 19b, and pair of left and right pick-off sensors 17al, 17ar and 17bl, 17br. Each of the pair of conduits 13a, 13a' and 13b, 13b' bend at two symmetrical locations along the conduits 13a, 13a' and 13b, 13b' length and are essentially parallel throughout their length. The conduits 13a, 13a' and 13b, 13b' are driven by the drive mechanisms 18a, 18b in opposite directions about their respective bending axes and at what is termed the first out-of-phase bending mode of the flow meter. The drive mechanisms 18a, 18b may comprise any one of many arrangements, such as a magnet mounted to the conduits 13a', 13b' and an opposing coil mounted to the conduits 13a, 13b and through which an alternating current is passed for vibrating both conduits 13a, 13a' and 13b, 13b'. A suitable drive signal is applied by the meter electronics 100 to the drive mechanisms 18a, 18b.

The first and second vibratory sensor 5a, 5b can be initially calibrated and a flow calibration factor FCF, along with a zero offset $\Delta T_0$, can be generated. In use, the flow calibration factor FCF can be multiplied by the time delay $\Delta T$ measured by the pickoffs minus the zero offset $\Delta T_0$ to generate a mass flow rate $\dot{m}$. An example of a mass flow rate equation utilizing a flow calibration factor FCF and a zero offset $\Delta T_0$ is described by Equation (1):

$$\dot{m} = FCF(\Delta T_{measured} - \Delta T_0) \quad (1)$$

Where:
$\dot{m}$=mass flow rate
FCF=flow calibration factor
$\Delta T_{measured}$=measured time delay
$\Delta T_0$=initial zero offset The temperature sensors 19a, 19b are mounted to conduits 13a', 13b' to continuously measure the temperature of the conduits 13a', 13b'. The temperature of the conduits 13a', 13b' and hence the voltage appearing across the temperature sensors 19a, 19b for a given current is governed by the temperature of the material passing through the conduits 13a', 13b'. The temperature dependent voltages appearing across the temperature sensors 19a, 19b may be used by the meter electronics 100 to compensate for the change in elastic modulus of the conduits 13a', 13b' due to any changes in conduit temperature. In the embodiment shown, the temperature sensors 19a, 19b are resistive temperature detectors (RTD). Although the embodiments described herein employ RTD sensors, other temperature sensors may be employed in alternative embodiments, such as thermistors, thermocouples, etc.

The meter electronics 100 receives the left and right sensor signals from the left and right pick-off sensors 17al, 17ar and 17bl, 17br and the temperature signals from the temperature sensors 19a, 19b via the first and second set of leads 11a, 11b. The meter electronics 100 provides a drive signal to the drive mechanisms 18a, 18b and vibrates the first and second pair of conduits 13a, 13a' and 13b, 13b'. The meter electronics 100 processes the left and right sensor signals and the temperature signals to compute the mass flow rate and the density of the material passing through the first and/or second meter assembly 10a, 10b. This information, along with other information, is applied by meter electronics 100 over path 26 as a signal.

As can be appreciated, although the dual vibratory sensor system 5 shown in FIGS. 1 and 2 includes only two meter assemblies 10a, 10b, the dual vibratory sensor system 5 may be employed in systems that include more than two meter assemblies. For example, a meter electronics may be configured to communicate with three or more meter assemblies. In such a configuration, the dual vibratory sensor system 5 may be a portion of the meter electronics and two of the three or more meter assemblies.

Meter Electronics

Figure 3:
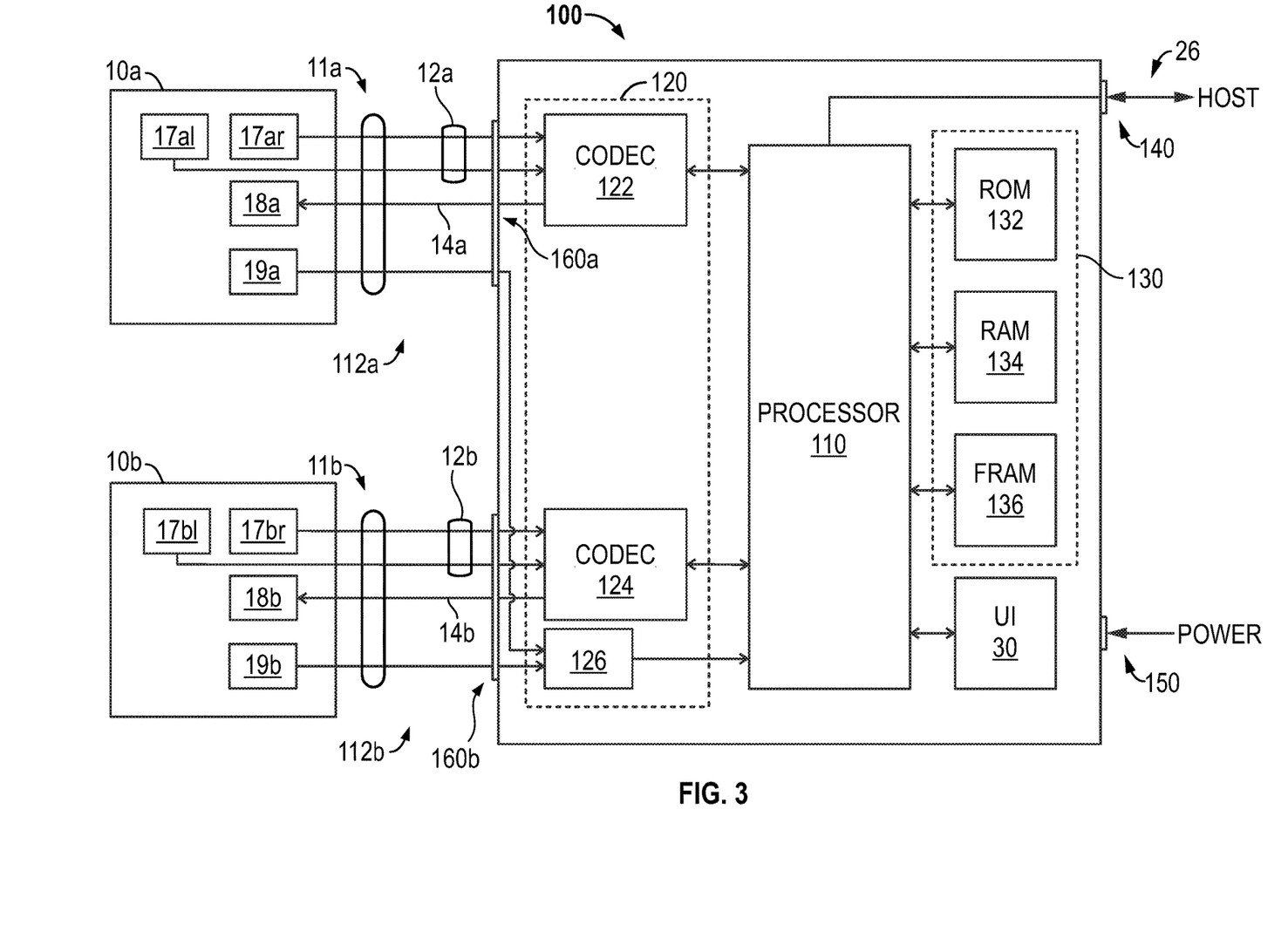
FIG. 3 shows a block diagram of the meter electronics 100.

FIG. 3 shows a block diagram of the meter electronics 100. As shown in FIG. 3, the meter electronics 100 is communicatively coupled to the first and second meter assembly 10a, 10b. As described in the foregoing with reference to FIG. 1, the first and second meter assembly 10a, 10b include the left and right pick-off sensors 17al, 17ar and 17bl, 17br, drive mechanisms 18a, 18b, and temperature sensors 19a, 19b, which are communicatively coupled to the meter electronics 100 via the first and second set of leads 11a, 11b through a first and second communication channel 112a, 112b and a first and second I/O port 160a, 160b.

The meter electronics 100 provides a first and second drive signal 14a, 14b via the leads 11a, 11b. More specifically, the meter electronics 100 provides a first drive signal 14a to the first drive mechanism 18a in the first meter assembly 10a. The meter electronics 100 is also configured to provide a second drive signal 14b to the second drive mechanism 18b in the second meter assembly 10b. In addition, a first and second sensor signal 12a, 12b are respectively provided by the first and second meter assembly 10a, 10b. More specifically, in the embodiment shown, the first sensor signal 12a is provided by the first pair of left and right pick-off sensors 17al, 17ar in the first meter assembly 10a. The second sensor signal 12b is provided by the second pair of left and right pick-off sensors 17bl, 17br in the second meter assembly 10b. As can be appreciated, the first and second sensor signal 12a, 12b are respectively provided to the meter electronics 100 through the first and second communication channel 112a, 112b.

The meter electronics 100 includes a processor 110 communicatively coupled to one or more signal processors 120 and one or more memories 130. The processor 110 is also communicatively coupled to a user interface 30. The processor 110 is communicatively coupled with the host via a communication port 140 over the path 26 and receives electrical power via an electrical power port 150. The processor 110 may be a microprocessor although any suitable processor may be employed. For example, the processor 110 may be comprised of sub-processors, such as a multi-core processor, serial communication ports, peripheral interfaces (e.g., serial peripheral interface), on-chip memory, I/O ports, and/or the like. In these and other embodiments, the processor 110 is configured to perform operations on received and processed signals, such as digitized signals.

The processor 110 may receive digitized sensor signals from the one or more signal processors 120. The processor 110 is also configured to provide information, such as a phase difference, a property of a fluid in the first or second meter assembly 10a, 10b, or the like. The processor 110 may provide the information to the host through the communication port 140. The processor 110 may also be configured to communicate with the one or more memories 130 to receive and/or store information in the one or more memories 130. For example, the processor 110 may receive calibration factors and/or meter assembly zeros (e.g., phase difference when there is zero flow) from the one or more memories 130. Each of the calibration factors and/or meter assembly zeros may respectively be associated with the first and second vibratory sensor 5a, 5b and/or the first and second meter assembly 10a, 10b. The processor 110 may use the calibration factors to process digitized sensor signals received from the one or more signal processors 120.

The one or more signal processors 120 is shown as being comprised of a first and second encoder/decoder (CODEC) 122, 124 and an analog-to-digital converter (ADC) 126. The one or more signal processors 120 may condition analog signals, digitize the conditioned analog signals, and/or provide the digitized signals. The first and second CODEC 122, 124 are configured to receive the left and right sensor signal from the left and right pick-off sensors 17al, 17ar and 17bl, 17br. The first and second CODEC 122, 124 are also configured to provide the first and second drive signal 14a, 14b to the first and second drive mechanism 18a, 18b. In alternative embodiments, more or fewer signal processors may be employed. For example, a single CODEC may be employed for the first and second sensor signal 12a, 12b and first and second drive signal 14a, 14b.

In the embodiment shown, the one or more memories 130 is comprised of a read-only memory (ROM) 132, random access memory (RAM) 134, and a ferroelectric random-access memory (FRAM) 136. However, in alternative embodiments, the one or more memories 130 may be comprised of more or fewer memories. Additionally or alternatively, the one or more memories 130 may be comprised of different types of memory (e.g., volatile, non-volatile, etc.). For example, a different type of non-volatile memory, such as, for example, erasable programmable read only memory (EPROM), or the like, may be employed instead of the FRAM 136.

As explained in more detail in the following, the meter electronics 100, one or more signal processors 120, or a portion thereof (e.g., a drive circuit, such as a voltage controlled oscillator, or the like) may provide the first drive signal 14a to the first meter assembly 10a and, after the first meter assembly 10a is operational (e.g., drawing a relatively low current), then provide the second drive signal 14b to the second meter assembly 10b. To determine if the first meter assembly 10a is operational, the meter electronics 100 can compare one or more operating parameters of the first meter assembly 10a with an operating threshold. The operating threshold may be a value stored in the one or more memories 130 to ensure that, when the meter electronics 100 drives the second meter assembly 10b, then the current drawn from the meter electronics 100 does not exceed the current capacity of the meter electronics 100.

Current as Operating Parameter

Figure 4:
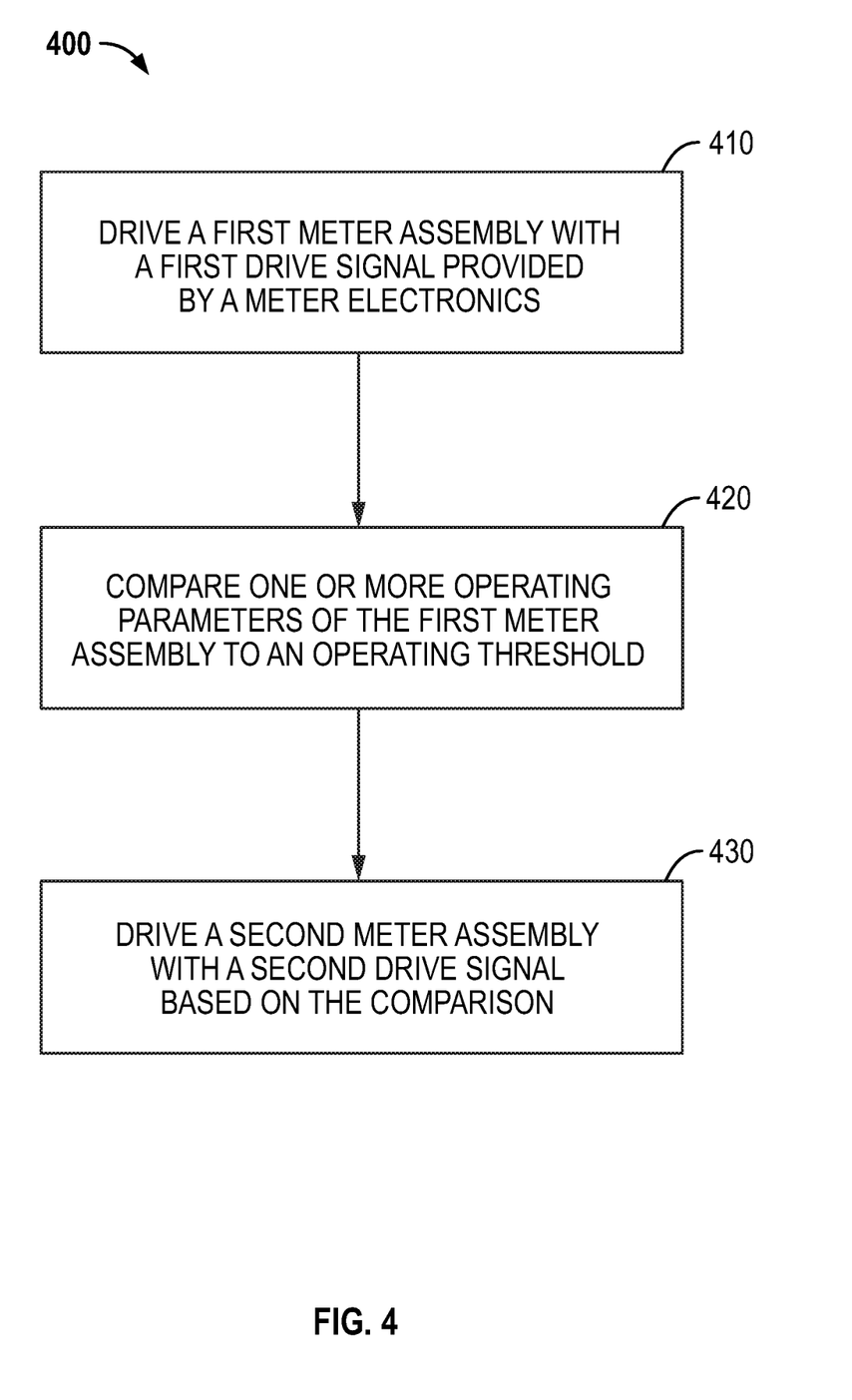
FIG. 4 shows a method 400 for limiting a current drawn by two or more meter assemblies.

FIG. 4 shows a method 400 for limiting a current drawn by two or more meter assemblies. In step 410, the method 400 drives a first meter assembly with a first drive signal. The first meter assembly employed by the method 400 may be the first meter assembly 10a described in the foregoing. In step 420, the method 400 compares the one or more operating parameters of the first meter assembly to an operating threshold. Based on this comparison, in step 430, the method 400 drives a second meter assembly with a second drive signal. The second drive signal may drive the second meter assembly to prevent a current drawn by the first meter assembly and the second meter assembly from exceeding a current threshold.

In step 410, with reference to the embodiment shown in FIGS. 1-3, the method 400 may drive the first meter assembly 10a with the first drive signal 14a over the first communication channel 112a. The first drive signal 14a may cause the first meter assembly 10a to vibrate at a frequency that may or may not be a resonance frequency of the first meter assembly 10a. If the first meter assembly 10a vibrates at or near the resonance frequency, then a current drawn by the first meter assembly 10a will be relatively low (e.g., near zero amps, less than the operating threshold, etc.). If the frequency is not the resonance frequency of the first meter assembly 10a, then the current drawn by first meter assembly 10a may be relatively high (e.g., greater than near zero ampere, greater than the operating threshold, etc.).

In step 420, the method 400 compares the one or more operating parameters of the first meter assembly to the operating threshold. For example, the method may compare a current drawn by the first meter assembly to the operating threshold. In an embodiment, if the current drawn by the first meter assembly is greater than the operating threshold, then the first meter assembly may not be vibrating at the resonance frequency. If the current drawn by the first meter assembly is less than the operating threshold, then the first meter assembly may be vibrating at the resonance frequency. The comparison between the one or more operating parameters and the operating threshold may be done during or after a threshold time-period.

For example, after a threshold time-period, the method 400 may determine that the first meter assembly 10a is or is not operational. With reference to the embodiment shown in FIGS. 1-3, the meter electronics 100 can indicate that the first meter assembly 10a is operational if the current drawn by the first meter assembly 10a falls below the operating threshold within the threshold time-period. The meter electronics 100 can also indicate that the first meter assembly 10a is not operational if the current drawn by the first meter assembly 10a does not fall below the operating threshold within the threshold time-period. Based on this comparison, the method 400 may cause the meter electronics 100 to drive the second meter assembly 10b in step 430.

In step 430, the method 400 drives the second meter assembly with the second drive signal such that the current drawn by the first meter assembly and the second meter assembly is less than the current threshold. The current threshold may be a value that is determined to, for example, ensure that the total current drawn from the meter electronics does not exceed the current capacity of the meter electronics. For example, with reference to the embodiment described with reference to FIGS. 1-3, the meter electronics 100 could provide the second drive signal 14b with a relatively low current so as to not exceed the current capacity of the meter electronics 100, even if the first drive signal current is still greater than the operating threshold. This may decrease the startup time of the dual vibratory sensor system 5 shown in FIGS. 1-3. Alternatively, the meter electronics 100 could, for example, provide the second drive signal 14b after the meter electronics 100 indicates that the current drawn by the first meter assembly 10a is less than the operating threshold.

As described in the foregoing, the method 400 limits a current drawn by two or more meter assemblies during startup of the two or more meter assemblies. That is, the current drawn by the two or more meter assemblies, if started up simultaneously, may initially exceed an electrical capacity of the meter electronics, which is limited by the method 400 as described in the foregoing. As can be appreciated, after startup, the current drawn by the two or more meter assemblies may be less than the electrical capacity of the meter electronics but subsequently increase due to, for example, changes in fluid properties (e.g., density, temperature, phase, etc.). The method 400 can also limit the current drawn by the two or more meter assemblies even when the current increases during normal operation.

For example, the meter electronics 100, during normal operation, may be driving the first and second meter assembly 10a, 10b at their respective resonance frequencies. Accordingly, the current drawn by the first and second meter assembly 10a, 10b may be less than the current threshold. More specifically, the current drawn by each of the first and second meter assembly 10a, 10b may be less than the operating threshold. During the normal operation, changes in the fluid property may cause the current drawn by the first and/or second meter assembly 10a, 10b to increase such that the current drawn by the first and second meter assembly 10a, 10b is greater than the current threshold.

In other words, based on the comparison between the one or more operating parameters of the first and/or second meter assembly 10a, 10b and the operating threshold, the method 400 can drive the first and/or second meter assembly 10a, 10b to prevent the current drawn by the first meter assembly 10a and the second meter assembly 10b from exceeding the current threshold. For example, the method 400 can reduce one or both of the currents drawn by the first and second meter assembly 10a, 10b if the currents exceed the operating threshold. Once the current drawn by the first and/or second meter assembly 10a, 10b is below the operating threshold, then the current drawn by the first and second meter assembly 10a, 10b may not be greater than the electrical capacity of the meter electronics 100.

Additional steps may be performed by the method 400. For example, the method 400 can also discontinue the first drive signal 14a if the comparison between the one or more operating parameters of the first meter assembly 10a and the operating threshold indicates that the first meter assembly 10a is not operational. That is, the meter electronics 100 could discontinue the first drive signal 14a by reducing a magnitude of the current drawn by the first meter assembly 10a to zero amps. For example, the voltage of the first drive signal 14a may be reduced to zero volts, which can reduce the current drawn to zero.

Additionally or alternatively, the method 400 can compare the one or more operating parameters of the second meter assembly 10b to the operating threshold. The method 400 may also discontinue the second drive signal 14b if, for example, the comparison indicates that the second meter assembly 10b is not operational. Similar to the first meter assembly 10a, the one or more operating parameters of the second meter assembly 10b may be a current drawn by the second meter assembly 10b.

Although the method 400 compares the current drawn by the first and second meter assembly 10a, 10b to the operating threshold, other operating parameters may be employed in alternative embodiments. For example, the one or more operating parameters may be a resonance frequency of the first or second meter assembly, as the following discussion illustrates.

Resonance Frequency as Operating Parameter

Figure 5:
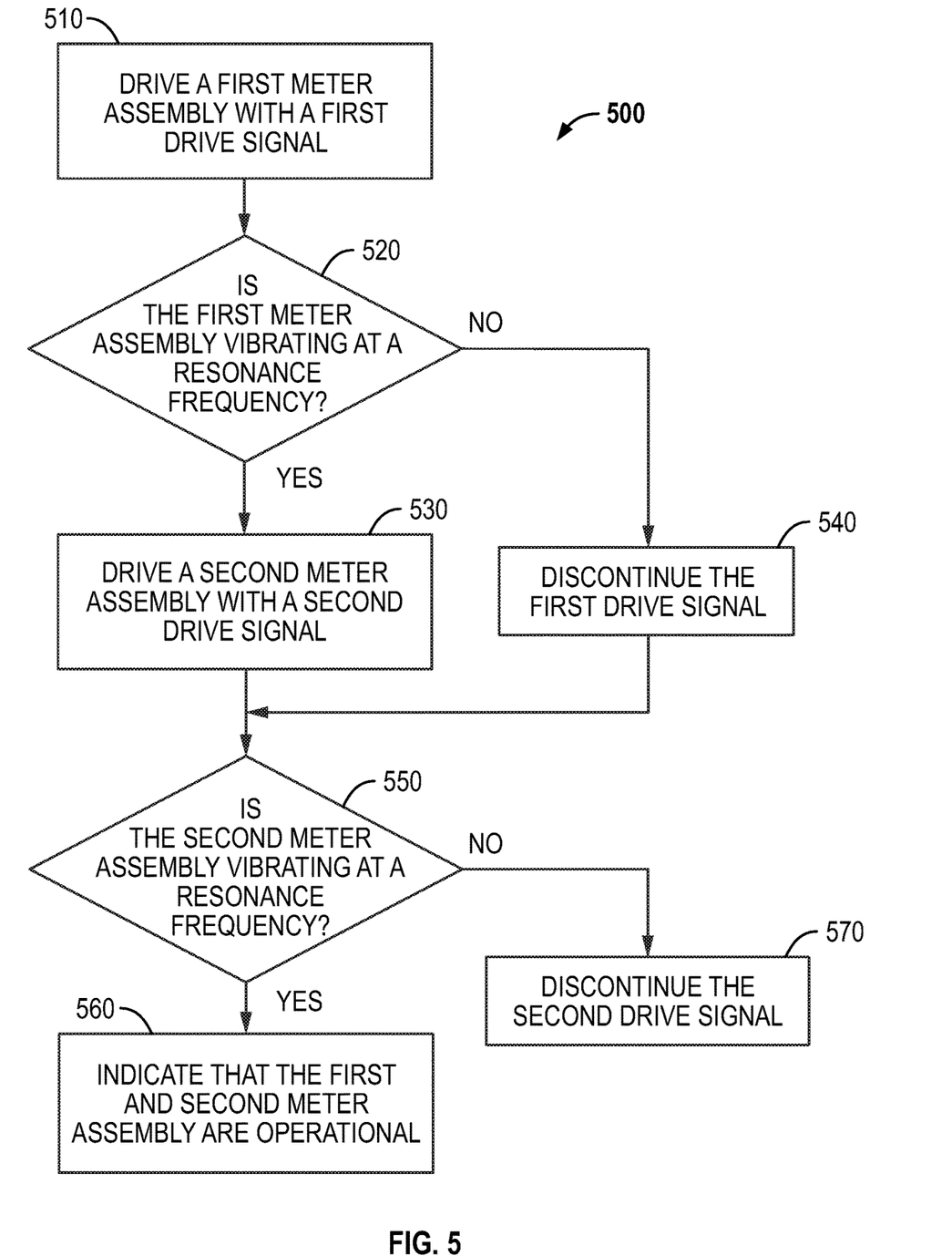
FIG. 5 shows another method 500 of limiting a current drawn by two or more meter assemblies.

FIG. 5 shows another method 500 of limiting a current drawn by two or more meter assemblies. In step 510, the method 500 drives a first meter assembly with a first drive signal. The first meter assembly may be the first meter assembly 10a described in the foregoing with reference to FIGS. 1-3. In step 520, the method 500 may determine if the first meter assembly is vibrating at a resonance frequency. If the first meter assembly is vibrating at the resonance frequency, then the method 500 proceeds to step 530. In step 530, the method 500 drives a second meter assembly with a second drive signal. If the first meter assembly is not vibrating at the resonance frequency, then the method 500 proceeds to step 540. In step 540, the first drive signal is discontinued. From both step 530 and step 540, the method 500 proceeds to step 550. In step 550, the method 500 determines if the second meter assembly is vibrating at a resonance frequency. If the second meter assembly is vibrating at the resonance frequency, then the method 500 may indicate that the first and second meter assembly is operational in step 560. If the second meter assembly is not vibrating at the resonance frequency, then the method 500 may discontinue the second drive signal in step 570.

As can be appreciated, in steps 510 and 530, the resonance frequencies of the first and second meter assembly may drift, change, or the like, due to changes in, for example, the fluids flowing through the conduits in the first and second meter assembly. As can also be appreciated, the resonance frequencies of the first and second meter assembly may or may not be the same. For example, the first meter assembly may have different size flow tubes than the second meter assembly. Accordingly, the resonance frequency of the first meter assembly may be different than the resonance frequency of the second meter assembly.

Steps 520 and 550, where the method 500 determines if the first and second meter assembly are vibrating at a resonance frequency, may be performed by any suitable method. For example, the meter electronics 100 described in the foregoing may measure a frequency of the first and second drive signal 14a, 14b and determine if the frequency is different than an operating threshold. The operating threshold may be a previously determined resonance frequency, to determine if the first and second drive signal 14a, 14b are vibrating at a resonance frequency. The previously determined resonance frequency may be stored in the one or more memories 130 in the meter electronics 100. Based on the comparison in steps 520 and 550, the method 500 may cause the meter electronics 100 to discontinue the first and second drive signal 14a, 14b with steps 540 and 570.

In steps 540 and 570, the method 500 can discontinue the first and second drive signal by, for example, reducing the current drawn by the first and second meter assembly to zero, removing voltage from a drive circuit in the meter electronics 100, or the like. As can be appreciated, the method 500 may also maintain the first and second drive signal if the first and second meter assembly are vibrating at their respective resonance frequency. That is, in step 520, if the method 500 determines that the first meter assembly is vibrating at the resonance frequency, then the method 500 may continue to drive the first meter assembly. Similarly, if the method 500 determines at step 550 that the second meter assembly is vibrating at the resonance frequency, then the method 500 may continue to vibrate the second meter assembly at the resonance frequency.

Additionally or alternatively, the method 500 may reduce the current drawn by the first meter assembly until the current falls below the operating threshold. That is, the current drawn by the first meter assembly may be limited by the operating threshold until, for example, the first meter assembly is vibrating at or near the resonance frequency. With reference to the meter electronics 100 described in the foregoing, when the first and second meter assembly 10a, 10b begins to vibrate at the resonance frequency, the current drawn by the first and second meter assembly 10a, 10b may be less than the current threshold. Accordingly, the current drawn by the first and second meter assembly 10a, 10b may be less than the electrical capacity of the meter electronics 100.

The embodiments described above limit a current drawn by two or more meter assemblies. Accordingly, the total current drawn by the first and second meter assembly 10a, 10b may not exceed the current capacity of the meter electronics 100. In addition, the total current drawn by the first and second meter assembly 10a, 10b may be limited by an operating threshold, which may be maximum current drawn by one of the first and second meter assembly 10a, 10b. This may allow the design of the meter electronics 100 to, for example, meet regulatory safety requirements as the number of meter assemblies driven by the meter electronics 100 increases. That is, the current capacity of the meter electronics 100 may remain the same even though two or more meter assemblies are driven by the meter electronics 100. As a result, the costs associated with increasing the current capacity of the meter electronics 100 is avoided while still meeting regulatory requirements.

The current drawn by the two or more meter assemblies may be limited in various systems. For example, in cryogenic systems, such as the LNG fueling system described in the foregoing with reference to FIG. 1, the meter electronics 100 could be configured for both a first meter assembly 10a that is in the LNG supply line SL and a second meter assembly 10b that is in the LNG return line RL. During startup, the meter electronics 100 may provide the first drive signal 14a to the first meter assembly 10a until the current drawn by the first meter assembly 10a is less than the operating threshold. The meter electronics 100 may then provide the second drive signal 14b to the second meter assembly 10b. If, during normal operation, the current drawn by the first and/or second meter assembly 10a, 10b increases, then the meter electronics 100 can reduce the current until the current is less than the operating threshold. Accordingly, the meter electronics 100 can be employed in the dual vibratory sensor system 5 without the costs associated with a meter electronics design that, for example, supports both of the meter assemblies 10a, 10b vibrating at an off-resonance frequency.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other systems and methods that limit a current drawn by two or more meter assemblies and not just to the embodiments described above and shown in the accompanying figures. Accordingly, the scope of the embodiments described above should be determined from the following claims.

We claim:

1. A method of limiting a current drawn by two or more meter assemblies, the method comprising:
    driving a first meter assembly with a first drive signal;
    comparing one or more operating parameters of the first meter assembly to an operating threshold; and
    driving a second meter assembly with a second drive signal based on the comparison to prevent a current drawn by the first meter assembly and the second meter assembly from exceeding a current threshold.

2. The method of claim 1, further comprising comparing one or more operating parameters of the second meter assembly to the operating threshold.

3. The method of claim 1, wherein the one or more operating parameters is one of a resonance frequency and a current of the first meter assembly and the second meter assembly.

4. The method of claim 1, further comprising indicating that the first meter assembly and the second meter assembly are operational.

5. The method of claim 1, further comprising reducing the current drawn by one of the first meter assembly and the second meter assembly based on the comparison.

6. The method of claim 5, wherein reducing the current drawn by one of the first meter assembly and the second meter assembly comprises one of:
    reducing the current drawn by the first meter assembly if the current drawn by the first meter assembly exceeds the operating threshold; and
    reducing the current drawn by the first meter assembly if the current drawn by the second meter assembly exceeds the operating threshold.

7. The method of claim 1, further comprising at least one of:
    discontinuing the first drive signal if the comparison indicates that the first meter assembly is not operational; and
    discontinuing the second drive signal if the comparison indicates that the second meter assembly is not operational.

8. The method of claim 1, wherein the first drive signal and the second drive signal are provided by a meter electronics communicatively coupled to the first meter assembly and the second meter assembly.

9. A dual vibratory sensor system (5) for limiting current drawn by two or more meter assemblies, the dual vibratory sensor system (5) comprising:
    a first meter assembly (10a);
    a second meter assembly (10b); and
    a meter electronics (100) communicatively coupled to the first meter assembly (10a) and the second meter assembly (10b), wherein the meter electronics (100) is configured to:

drive the first meter assembly (10*a*) with a first drive signal (14*a*);

compare one or more operating parameters of the first meter assembly (10*a*) to an operating threshold; and drive a second meter assembly (10*b*) with a second drive signal (14*b*) based on the comparison to prevent a current drawn by the first meter assembly (10*a*) and the second meter assembly (10*b*) from exceeding a current threshold.

10. The dual vibratory sensor system (5) of claim 9, wherein the meter electronics (100) is further configured to compare one or more operating parameters of the second meter assembly (10*b*) to the operating threshold.

11. The dual vibratory sensor system (5) of claim 9, wherein the one or more operating parameters is one of a resonance frequency and a current of the first meter assembly (10*a*) and the second meter assembly (10*b*).

12. The dual vibratory sensor system (5) of claim 9, wherein the meter electronics (100) is further configured to indicate that the first meter assembly (10*a*) and the second meter assembly (10*b*) are operational.

13. The dual vibratory sensor system (5) of claim 9, wherein the meter electronics (100) is further configured to reduce the current drawn by one of the first meter assembly (10*a*) and the second meter assembly (10*b*) based on the comparison.

14. The dual vibratory sensor system (5) of claim 13, wherein reducing the current drawn by one of the first meter assembly (10*a*) and the second meter assembly (10*b*) comprises one of:

reducing the current drawn by the first meter assembly (10*a*) if the current drawn by the first meter assembly (10*a*) exceeds the operating threshold; and reducing the current drawn by the first meter assembly (10*a*) if the current drawn by the second meter assembly (10*b*) exceeds the operating threshold.

15. The dual vibratory sensor system (5) of claim 9, further comprising at least one of:

discontinuing the first drive signal if the comparison indicates that the first meter assembly (10*a*) is not operational; and discontinuing the second drive signal if comparison indicates that the second meter assembly (10*b*) is not operational.

\* \* \* \* \*